US012584727B2

(12) United States Patent
Fukuda et al.

(10) Patent No.: US 12,584,727 B2
(45) Date of Patent: Mar. 24, 2026

(54) DIMENSION MEASUREMENT METHOD AND DIMENSION MEASUREMENT DEVICE

(71) Applicant: Panasonic Intellectual Property Management Co., Ltd., Osaka (JP)

(72) Inventors: Masaki Fukuda, Osaka (JP); Toru Matsunobu, Osaka (JP); Satoshi Yoshikawa, Hyogo (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 471 days.

(21) Appl. No.: 17/942,548

(22) Filed: Sep. 12, 2022

(65) Prior Publication Data

US 2023/0003506 A1    Jan. 5, 2023

Related U.S. Application Data

(63) Continuation of application No. PCT/JP2021/006668, filed on Feb. 22, 2021.

(30) Foreign Application Priority Data

Mar. 24, 2020    (JP) ................................. 2020-052313

(51) Int. Cl.
G01B 11/02        (2006.01)
G06T 7/12         (2017.01)
(Continued)

(52) U.S. Cl.
CPC ................ G01B 11/02 (2013.01); G06T 7/12 (2017.01); G06T 7/13 (2017.01); G06T 7/62 (2017.01); G06T 17/00 (2013.01); G06V 10/44 (2022.01); G06V 10/761 (2022.01)

(58) Field of Classification Search
CPC .. G01B 11/02; G06T 7/62; G06T 7/12; G06T 7/13; G06T 17/00; G06V 10/761; G06V 10/44
(Continued)

(56) References Cited

U.S. PATENT DOCUMENTS

2010/0166294 A1*  7/2010  Marrion ............... G06V 10/757
                                                                    382/154
2011/0150279 A1   6/2011  Kotake
(Continued)

FOREIGN PATENT DOCUMENTS

CN        110782524        2/2020
JP        2006-66966       3/2006
(Continued)

OTHER PUBLICATIONS

Liscio, Eugene. "Extracting accurate measurements from single surveillance camera images." Photomodeler 6 (2017): 15. (Year: 2017).*

(Continued)

*Primary Examiner* — Jonathan S Lee
(74) *Attorney, Agent, or Firm* — WENDEROTH, LIND & PONACK, L.L.P.

(57) ABSTRACT

A dimension measurement method includes: extracting a plurality of lines from a plurality of images generated by shooting a target area from a plurality of viewpoints, and generating a line segment model which is a three-dimensional model of the target area that is expressed using the plurality of lines; calculating a dimension of a particular part inside the target area, using the line segment model; and outputting the dimension calculated.

11 Claims, 11 Drawing Sheets

(51) Int. Cl.

| | |
|---|---|
| *G06T 7/13* | (2017.01) |
| *G06T 7/62* | (2017.01) |
| *G06T 17/00* | (2006.01) |
| *G06V 10/44* | (2022.01) |
| *G06V 10/74* | (2022.01) |

(58) Field of Classification Search
USPC ........................................................ 382/154
See application file for complete search history.

(56) References Cited

U.S. PATENT DOCUMENTS

| | | | | |
|---|---|---|---|---|
| 2013/0083990 A1* | 4/2013 | Stone | .................. | G06V 20/647 |
| | | | | 382/141 |
| 2019/0066224 A1* | 2/2019 | Strange | ............. | G06V 30/1475 |

FOREIGN PATENT DOCUMENTS

| | | |
|---|---|---|
| JP | 2011-134012 | 7/2011 |
| JP | 2019-152533 | 9/2019 |
| WO | 2015/178014 | 11/2015 |
| WO | 2017/056567 | 4/2017 |
| WO | WO-2017056567 A1 * | 4/2017 |

OTHER PUBLICATIONS

International Search Report (ISR) issued on Apr. 13, 2021 in International (PCT) Application No. PCT/JP2021/006668.

Extended European Search Report issued Aug. 4, 2023 in corresponding European Patent Application No. 21775971.1.

Hao Du et al., "Interactive 3D modeling of indoor environments with a consumer depth camera", Proceedings of the 13th International Conference on Ubiquitous Computing, Jan. 2011, pp. 1-10, XP055213235.

Yangbin Lin et al., "Line segment extraction for large scale unorganized point clouds", ISPRS Journal of Photogrammetry and Remote Sensing, vol. 102, Apr. 2015, pp. 172-183, XP093064982.

Office Action issued Dec. 7, 2025 in corresponding Chinese Patent Application No. No. 202180018963.2 (with partial English translation).

* cited by examiner

Start

Detect line segment
S31

Calculate line segment feature amount
S32

Perform line segment matching
S33

Estimate camera parameters
and three-dimensional position
of line segments
S34

End

S12

Line segment detection

Viewpoint *i*     Image plane     Viewpoint *j*

Viewpoint *i*     Matching     Viewpoint *j*

Line segment three-dimensional position estimation

Viewpoint *i*     Viewpoint *j*

Camera parameter estimation

Distance: 80 cm

Start

S41

Obtain images

S42

Perform preprocessing

S43

Perform line segment reconstruction

S44

Select line segments included in plane

S45

Perform plane estimation

S46

Select measurement targets

S47

Calculate distance between targets

End

Perform re-shooting so that entirety of target object fits inside the frame

DIMENSION MEASUREMENT METHOD AND DIMENSION MEASUREMENT DEVICE

CROSS REFERENCE TO RELATED APPLICATIONS

This is a continuation application of PCT International Application No. PCT/JP2021/006668 filed on Feb. 22, 2021, designating the United States of America, which is based on and claims priority of Japanese Patent Application No. 2020-052313 filed on Mar. 24, 2020. The entire disclosures of the above-identified applications, including the specifications, drawings and claims are incorporated herein by reference in their entirety.

FIELD

The present disclosure relates to a dimension measurement method and a dimension measurement device.

BACKGROUND

In the measurement of building structures, and so on, the burden on a worker can be reduced by generating a three-dimensional model using a plurality of images that have been shot. For example, Patent Literature (PTL) 1 discloses a method of calculating the shape of a structure by performing point cloud measurement using a multi-viewpoint image measurement method based on a plurality of images.

CITATION LIST

Patent Literature

PTL 1: Japanese Unexamined Patent Application Publication No. 2019-152533

SUMMARY

Technical Problem

In such measurement using a three-dimensional model, there is a demand for reducing the processing amount. The present disclosure has as an object to provide a dimension measurement method or a dimension measuring device that can reduce the processing amount.

Solution to Problem

A dimension measurement method according to an aspect of the present disclosure includes: extracting a plurality of lines from a plurality of images generated by shooting a target area from a plurality of viewpoints, and generating a line segment model which is a three-dimensional model of the target area that is expressed using the plurality of lines; calculating a dimension of a particular part inside the target area, using the line segment model; and outputting the dimension calculated.

Advantageous Effects

The present disclosure is capable of providing a dimension measurement method or a dimension measuring device that is capable of reducing the processing amount.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
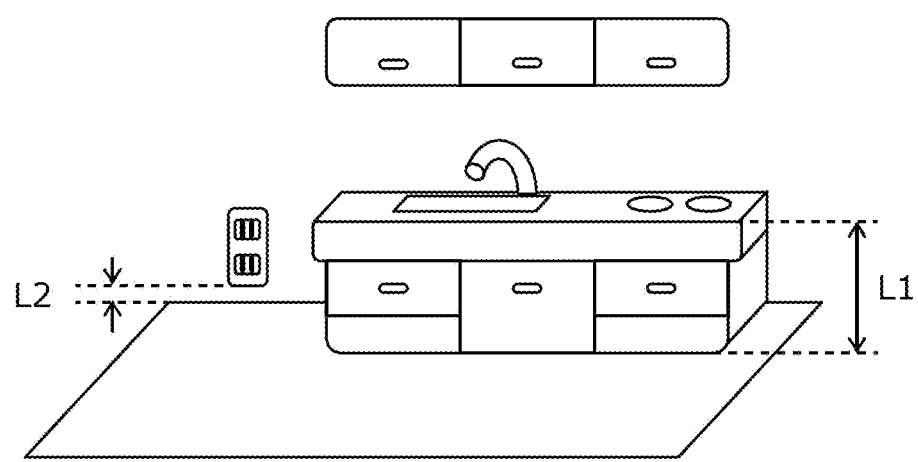
FIG. 1 is a diagram illustrating an example of dimension measurement according to an embodiment.

A dimension measurement method according to an aspect of the present disclosure includes: generating, using a plurality of images generated by shooting a target area from a plurality of viewpoints, a line segment model which is a three-dimensional model of the target area that is expressed using lines; calculating a dimension of a particular part inside the target area, using the line segment model; and outputting the dimension calculated.

Accordingly, the dimension measurement method is capable of reducing the processing amount by calculating the dimension using a line segment model. For example, compared to a case where the shape of the target area is represented by a point cloud, by representing only an edge of the target area using a line, the processing amount can be reduced. Specifically, in a dimension measurement method which uses a three-dimensional model in which, aside from edges of the target area, a plane of the target area is also represented by a point cloud, in order to perform measurement for an edge of the target area, it is necessary to extract only the point cloud representing the edge from the three-dimensional model. In contrast, according to a dimension measurement method according to an aspect of the present disclosure, the line segment model only includes the point cloud representing edges of the target area, and thus it is not necessary to extract the point cloud representing the edge. Furthermore, the data amount of the line segment model according to an aspect of the present disclosure is less than the data amount of a three-dimensional model in which a plane of the target area is also expressed by a point cloud.

For example, the dimension measurement method may further include displaying a user interface including the line segment model, and the particular part may be determined based on lines which are included in the line segment model and specified by a user via the user interface.

Accordingly, by having the user select a plurality of lines from a line segment model, the dimension of the particular part which is based on the selected plurality of lines is measured. Accordingly, the user can easily measure the dimension of the desired part.

For example, the dimension may be a distance between two lines selected by the user via the user interface.

Accordingly, by having the user select two lines from the line segment model, the distance between the selected two lines is measured. Accordingly, the user can easily measure the dimension of the desired part.

For example, the dimension may be a distance between a line and a plane that are selected by the user via the user interface.

Accordingly, by having the user select a plurality of lines from the line segment model, a dimension between the line and the plane which is based on the selected plurality of lines is measured. Accordingly, the user can easily measure the dimension of the desired part.

For example, the plane may be defined by two lines selected by the user via the user interface.

Accordingly, the user can easily select a desired plane.

For example, the dimension measurement method may further include presenting, to the user, a message prompting the user to shoot an entirety of a target object included in the target area, when the entirety of a target object is not included in an image that has been shot.

Accordingly, the dimension measurement method is able to generate a line segment model using an image generated by shooting the entirety of the target object, and thus is able to improve the accuracy of the line segment model. Therefore, the dimension measurement method can improve dimension measurement accuracy.

For example, the lines may be a line segment.

Accordingly, the dimension measurement method is able to generate a line segment model using a line segment which has both ends, without having to use the portion that is cut off in the image, and thus is able to improve the accuracy of the line segment model.

Furthermore, a dimension measurement device according to an aspect of the present disclosure includes: a processor and a memory. Using the memory, the processor generates, using a plurality of images generated by shooting a target area, a line segment model which is a three-dimensional model of the target area that is expressed using lines; calculates a dimension of a particular part inside the target area, using the line segment model; and outputs the dimension calculated.

Accordingly, the dimension measurement device is capable of reducing the processing amount by calculating the dimension using a line segment model.

Furthermore, a dimension measurement device according to another aspect of the present disclosure includes: an input interface, a processor, and an output interface. Images shot from a plurality of viewpoints of a target area are inputted to the input interface. The processor generates a three-dimensional model that represents the target area using lines, based on the images. The processor calculates the dimensions of a particular part of the three-dimensional model. The calculated dimensions are outputted from an output interface.

It should be noted that these generic and specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the Drawings. It should be noted that each of the embodiments described hereafter illustrates a specific example of the present disclosure. The numerical values, shapes, materials, structural components, the arrangement and connection of the structural components, steps, the processing order of the steps, etc., shown in the following embodiments are mere examples, and are therefore not intended to limit the present disclosure. Furthermore, among the structural components in the following embodiments, structural components not recited in the independent claims are described as optional structural components.

Embodiment

In the construction industry, the shortage of manpower is becoming severe, and thus it is necessary to improve efficiency of site management operations. Furthermore, there is a demand for improving efficiency of inspection tasks for which a considerable number of man-hours is allotted among site management operations. In dimension measurement included in the inspection tasks, a person has to perform the measurements using a tape measure, for example, and thus the burden on the worker is great.

The present embodiment will describe a device and a method that can automatically measure dimensions of a target from video shot using a camera, in a mobile terminal, for example.

Figure 2:
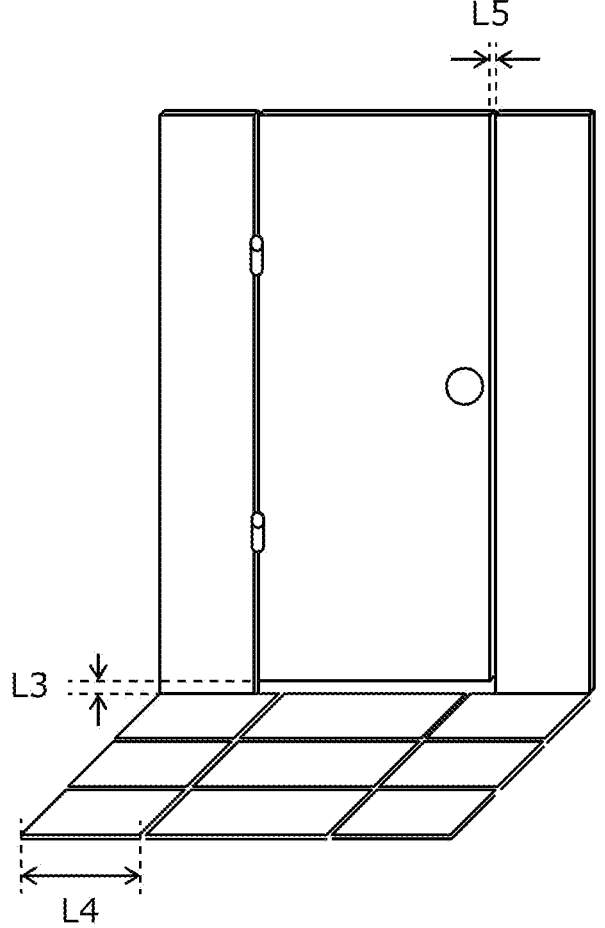
FIG. 2 is a diagram illustrating an example of dimension measurement according to an embodiment.

FIG. 1 and FIG. 2 are diagrams illustrating examples of a dimension measurement. FIG. 1 illustrates an example of a kitchen in which, for example, height L1 of a kitchen counter and distance L2 from the floor to an electric outlet are to be measured. Here, each of L1 and L2 is defined as a distance between a plane and a line. For example, L1 is the distance between the floor (a plane) and one side of the counter (a line).

FIG. 2 illustrates an example of a front door area in which, for example, door undercut L3 (i.e., the distance between the floor and the bottom side of the door), tile width L4, and door gap L5 are to be measured. In this example, L3 is a distance between a line and a plane, and L4 and L5 are distances between a line and a line. In this manner, in the present embodiment, distances between a line and a line or a line and a plane are measured.

Figure 3:
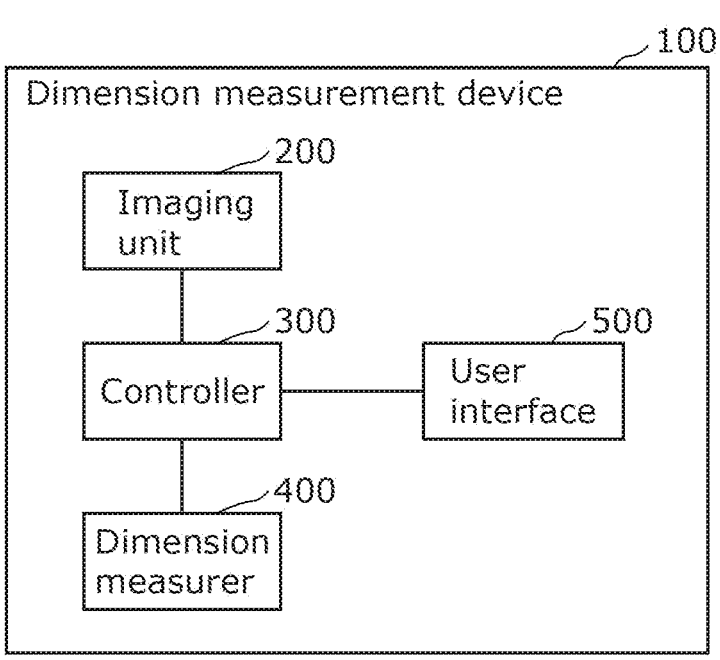
FIG. 3 is a block diagram of a dimension measurement device according to an embodiment.

Next, the configuration of a dimension measurement device according to the present embodiment will be described. FIG. 3 is a block diagram of dimension measurement device 100 according to the present embodiment. Dimension measurement device 100 includes imaging unit 200, controller 300, dimension measurer 400, and user interface 500. For example, this dimension measurement device 100 is included in a tablet terminal or a mobile terminal such as a smart phone, etc.

Imaging unit 200 shoots images (a moving image or a still image). Controller 300 controls imaging unit 200, dimension measurer 400, and user interface 500. Dimension measurer 400 generates a line segment model which is a three-dimensional model represented by line segments, by performing line segment reconstruction using an image shot by imaging unit 200. Stated differently, a line segment model is a model obtained by removing shapes (for example, planes) other than line segments from a three-dimensional model. Furthermore, dimension measurer 400 measures, using a line segment model, a dimension (distance) of a part specified by a user.

It should be noted that, a three-dimensional model is a representation of a shot measurement target made on a computer. The three-dimensional model, for example, has position information of respective three-dimensional parts on the measurement target. Furthermore, aside from line segments, the line segment model may be a three-dimensional model represented using lines. Here, a line refers to a line segment which has two ends, a half-line which has only one end, a line which has no ends, or a combination thereof. Furthermore, having no ends means that the ends are cut off in the image, for example.

User interface 500 receives input from a user. Furthermore, user interface 500 presents information to the user. For example, user interface 500 is a display and a touch panel. It should be noted that, user interface 500 is not limited to the above examples, and may be any user interface. For example, user interface 500 may include a microphone, a speaker, and so on.

Figure 4:
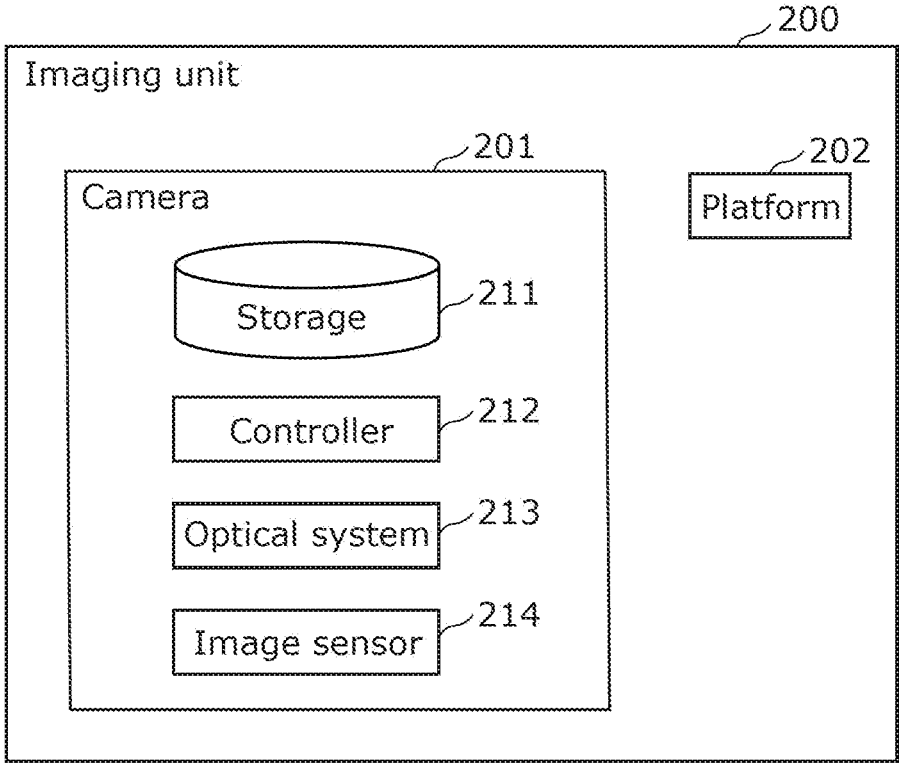
FIG. 4 is a block diagram of an imaging unit according to an embodiment.

FIG. 4 is a block diagram illustrating the configuration of imaging unit 200. Imaging unit 200 includes camera 201 and platform 202. Camera 201 includes storage 211, controller 212, optical system 213, and image sensor 214. Storage 211 stores images shot by image sensor 214. Controller 212 controls storage 211, optical system 213, and image sensor 214. Optical system 213 includes a lens, and so on, for allowing light to enter image sensor 214. Image sensor 214 shoots an image. Platform 202 controls the shooting direction of camera 201.

Figure 5:
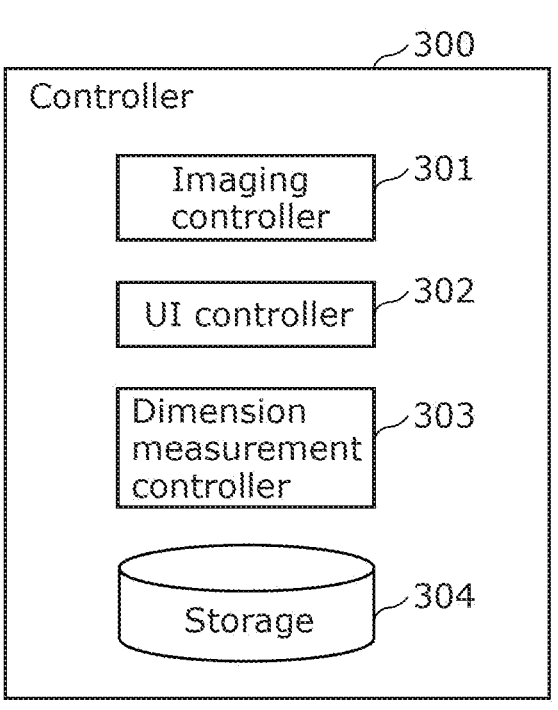
FIG. 5 is a block diagram of a controller according to an embodiment.

FIG. 5 is a block diagram illustrating the configuration of controller 300. Controller 300 includes imaging controller 301, UI controller 302, dimension measurement controller 303, and storage 304. Image controller 301 controls imaging unit 200. UI controller 302 controls user interface 500. Dimension measurement controller 303 controls dimension measurer 400. Storage 304 stores images shot by imaging unit 200, a line segment model generated by dimension measurer 400, and so on.

Figure 6:
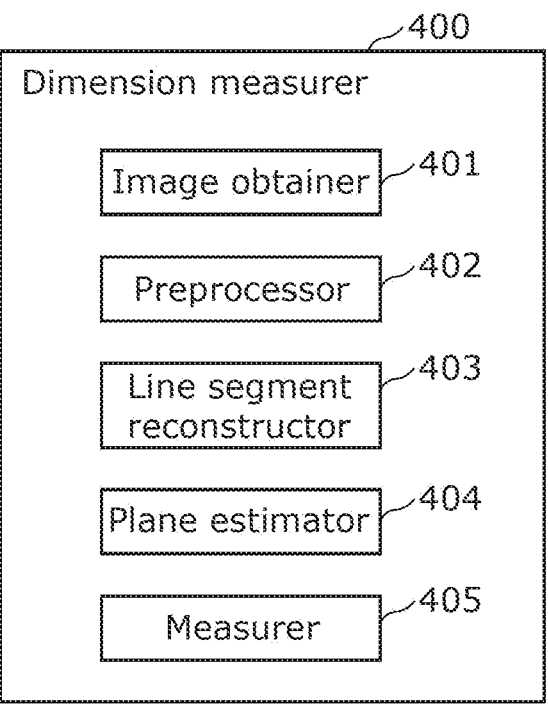
FIG. 6 is a block diagram of a dimension measurer according to an embodiment.

FIG. 6 is a block diagram illustrating the configuration of dimension measurer 400. Dimension measurer 400 includes image obtainer 401, preprocessor 402, line segment reconstructor 403, plane estimator 404, and measurer 405. Image obtainer 401 obtains images shot by imaging unit 200. Preprocessor 402 performs preprocessing on the obtained images. Line segment reconstructor 403 generates a line segment model by performing line segment reconstruction using the pre-processed images. Plane estimator 404 estimates a plane included in the line segment model. Measurer 405 measures, using a line segment model, the distance between line segments or the distance between a line segment and a plane.

Figure 7:
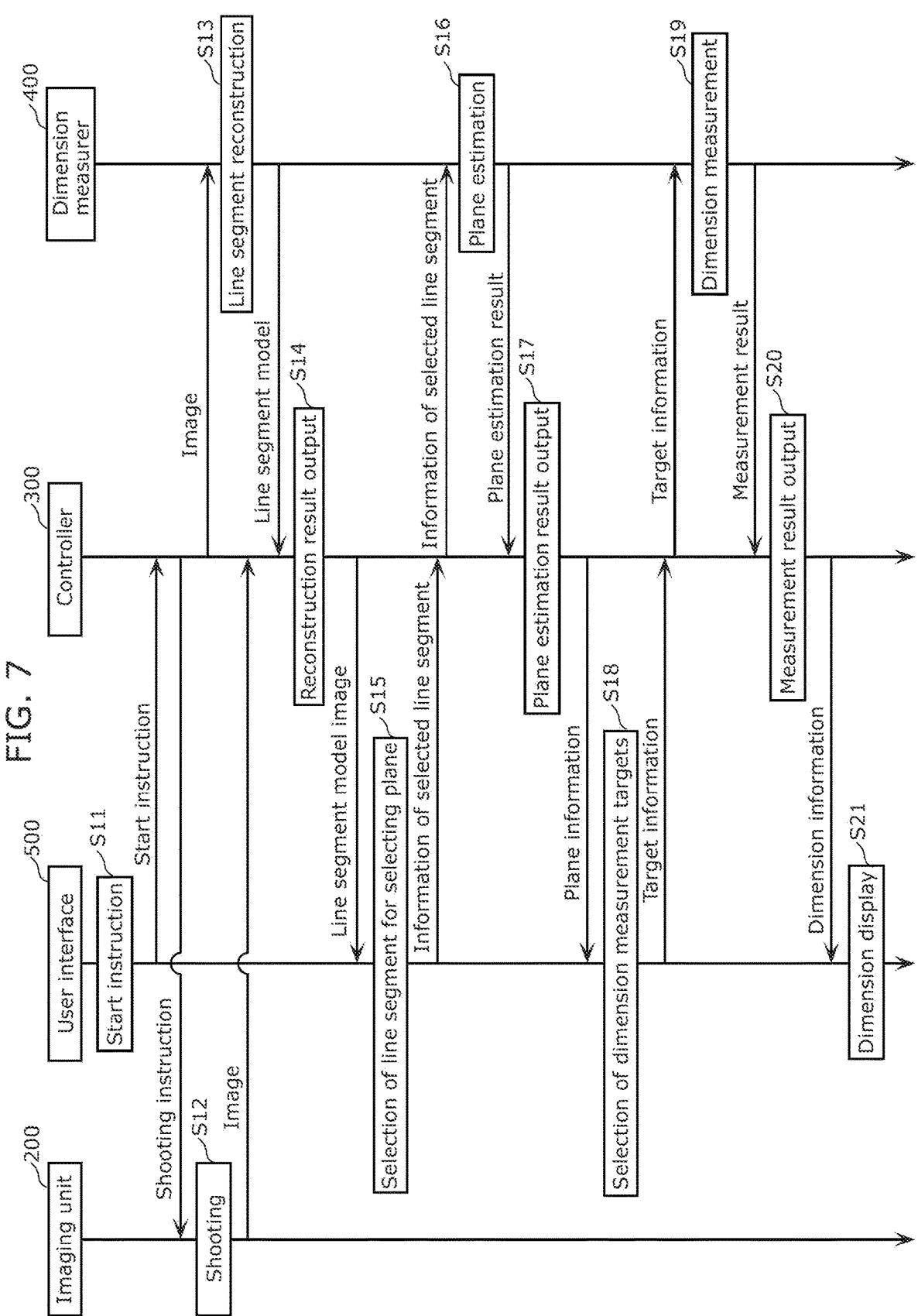
FIG. 7 is a sequence diagram of a dimension measurement process according to an embodiment.

FIG. 7 is a sequence diagram of a dimension measurement process by dimension measurement device 100. This example is an example of a case of measuring the distance between a line segment and a plane. First, the user performs a shooting start instruction via the user interface (S11). For example, the start instruction is performed by the selection of a menu or the activation of an application, or the like, on a screen.

Figures 8, 9:
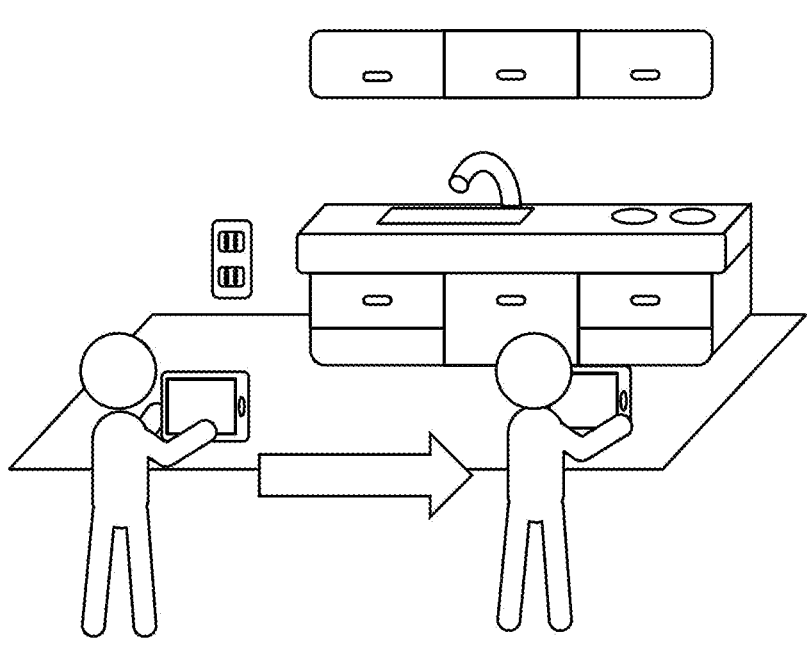
FIG. 8 is a diagram illustrating an example of image shooting according to an embodiment.
FIG. 9 is a flowchart of a line segment reconstruction process according to an embodiment.

When controller 300 receives the start instruction, controller 300 sends a shooting instruction to imaging unit 200. Imaging unit 200 shoots images (still images) in accordance with the shooting instruction (S12). Here, the images (still images) obtained are two or more images of the same target object (or target space) shot from different viewpoints. FIG. 8 is a diagram illustrating an example of the shooting of the images. For example, the user shoots images of the target object (for example, the kitchen) from different positions using a single imaging device (for example, a tablet terminal).

It should be noted that imaging unit 200 does not necessarily have to be included in dimension measurement device 100, and may be included in a terminal different from the terminal in which dimension measurement device 100 is included. In this case, the images shot by imaging unit 200 are sent to dimension measurement device 100 via any communication means such as wireless communication, etc.

Furthermore, the images may be a plurality of images shot using a plurality of fixed cameras. Furthermore, the images may be images from two viewpoints shot from one position using a stereo camera. Furthermore, the images may be a plurality of frames included in a moving image shot by a single camera while moving. Furthermore, the images may be a combination of the above.

The shot images are sent to dimension measurer 400 via controller 300. Dimension measurer 400 generates a line segment model by performing line segment reconstruction using the images (S13).

Figure 11:
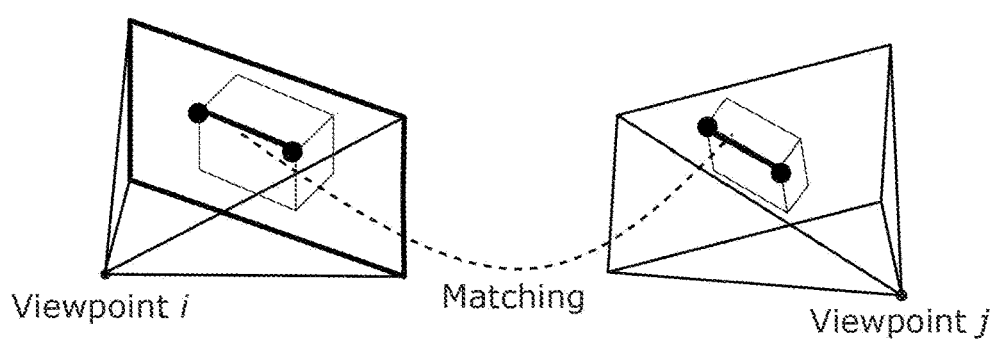
FIG. 11 is a schematic diagram for describing line segment reconstruction according to an embodiment.
Figure 12:
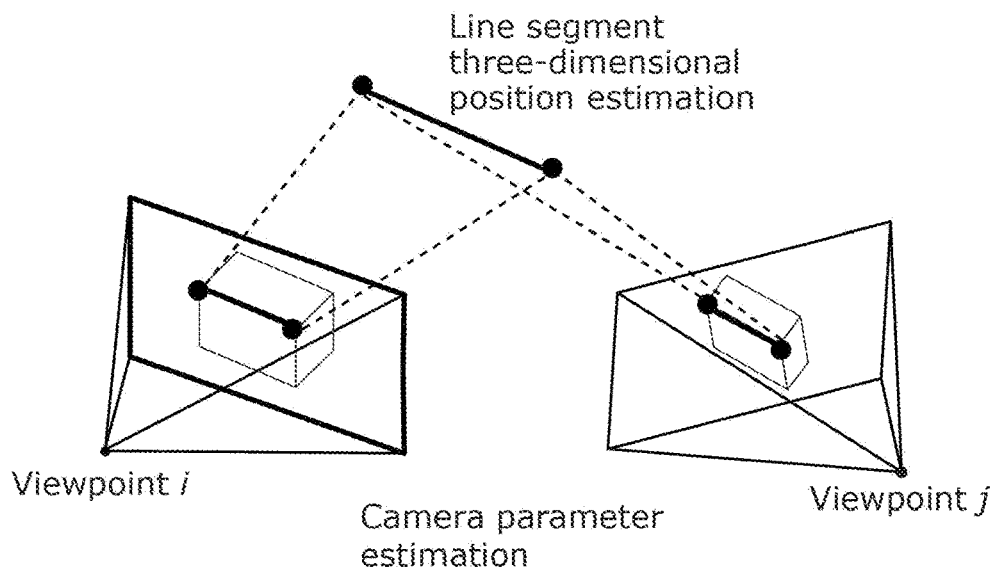
FIG. 12 is a schematic diagram for describing line segment reconstruction according to an embodiment.

Hereinafter, the line segment reconstruction process (S13) will be described. FIG. 9 is a flowchart of the line segment reconstruction process (S13). Furthermore, FIG. 10 to FIG. 12 are schematic diagrams for describing the line segment reconstruction.

Figure 10:
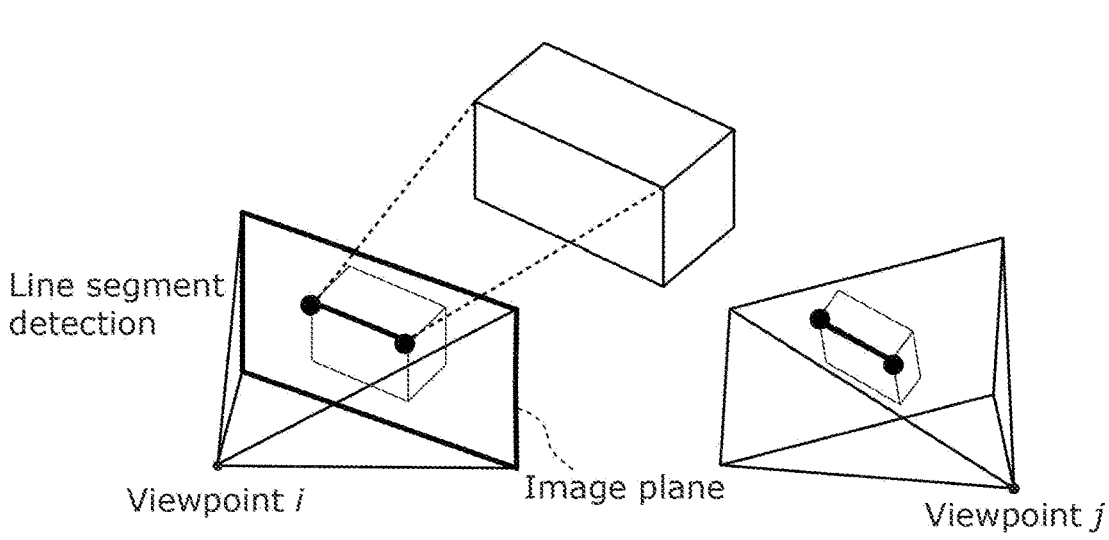
FIG. 10 is a schematic diagram for describing line segment reconstruction according to an embodiment.

First, as illustrated in FIG. 10 dimension measurer 400 detects the line segments included in the respective images (S31). Next, dimension measurer 400 calculates the feature amount of each line segment (S32). Next, as illustrated in FIG. 11, dimension measurer 400 performs matching of line segments between images, using the calculated feature amounts (S33). Specifically, dimension measurer 400 detects corresponding line segments which are line segments that correspond to each other (i.e., are the same) between images. Next, as illustrated in FIG. 12, dimension measurer 400 estimates the camera parameters (three-dimensional positions and orientations) of the respective images and the three-dimensional position of the line segment, by geometrical calculation using the relationship between the corresponding lines (S34).

It should be noted that the above-described line segment reconstruction method is one example, and any commonly known method may be used. For example, dimension measurer 400 may generate, using a plurality of images, a three-dimensional model represented by point cloud data (point cloud), and generate a line segment model by detecting line segments included in the generated three-dimensional model.

Description of FIG. 7 will be carried out again. The line segment model generated by line segment reconstruction (S13) is sent to controller 300. Controller 300 generates, using the line segment model, a line segment model image of the line segment model as seen from a predetermined direction, and sends the line segment model image to user interface 500 (S14).

Figure 13:
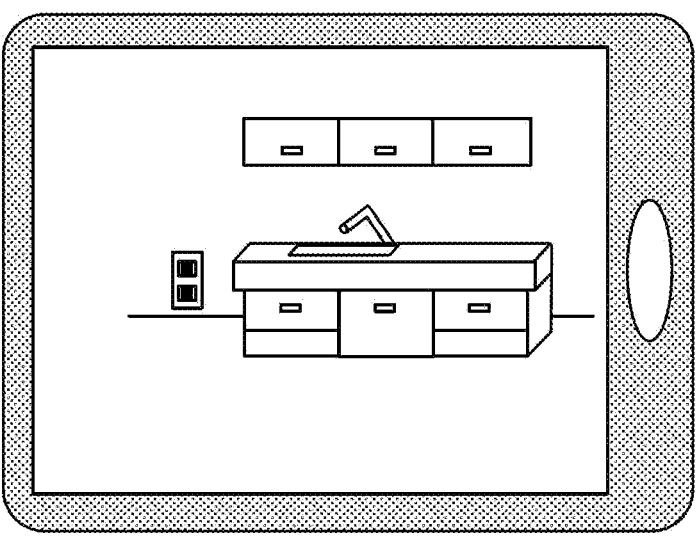
FIG. 13 is a diagram illustrating an example of a screen display according to an embodiment.

User interface 500 displays a UI (user interface) including the line segment model image. FIG. 13 is a diagram illustrating an example of a screen display in the above case. It should be noted that, with regard to this screen display, the user may change viewpoint positions and perform scaling. In other words, the viewpoint of a line segment model displayed may be manipulable by the user. Furthermore, a line segment model image may be displayed superimposed on an image. The image may be a real time image that is currently being shot, or may be an image shot in the past. Specifically, the viewpoint of the line segment model displayed may be the same as the viewpoint of the image onto which the line segment model is superimposed.

Figure 14:
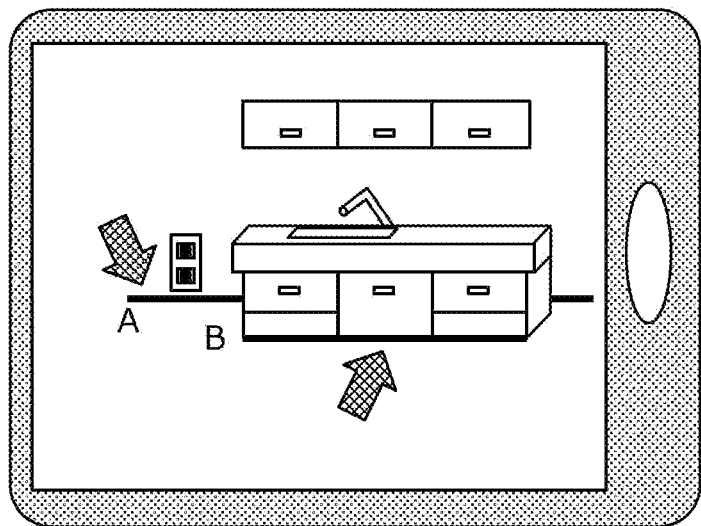
FIG. 14 is a diagram illustrating an example of a screen display according to an embodiment.

The user selects, in the screen display, two or more line segments for selecting a plane (S15). FIG. 14 is a diagram illustrating an example of a screen display in the above case. In the example illustrated in FIG. 14, line segment A and line segment B are selected. Information indicating the selected line segments is sent to dimension measurer 400 via controller 300.

Figure 15:
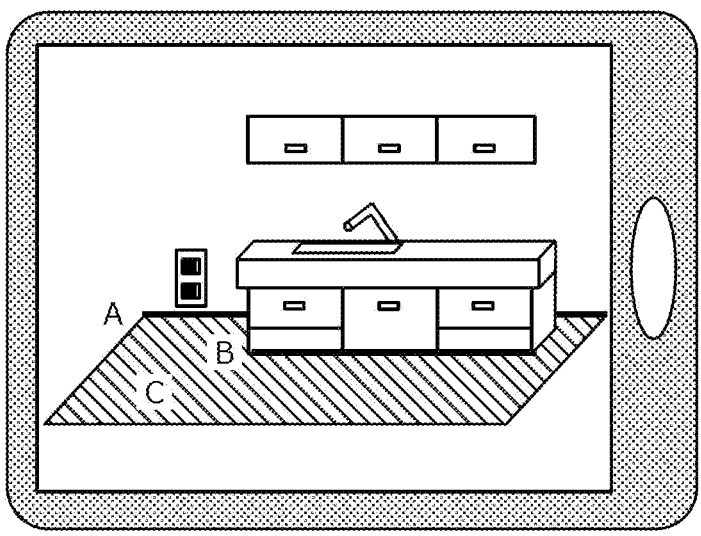
FIG. 15 is a diagram illustrating an example of a screen display according to an embodiment.

Dimension measurer 400 estimates, based on the information on the selected line segments, a plane that includes the selected line segments (S16). For example, as illustrated in FIG. 15, plane C (the floor) including line segment A and line segment B is detected. The information of the estimated plane is sent to controller 300. Controller 300 superimposes the information of the plane onto the line segment model image, and outputs the image obtained to the user interface 500 (S17).

Figure 16:
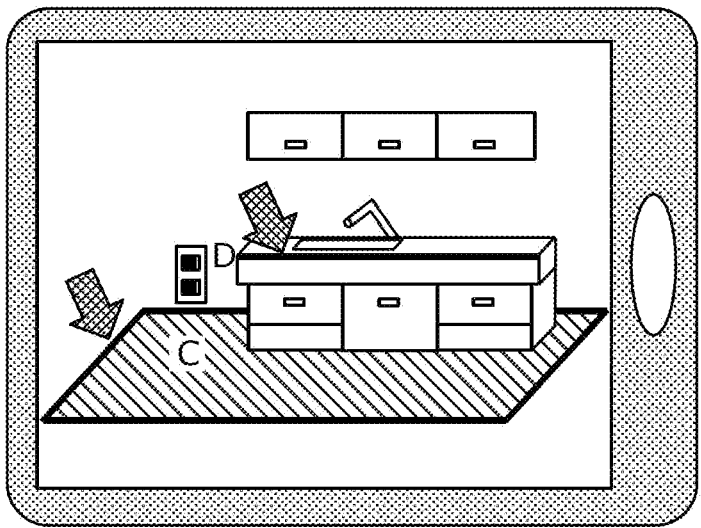
FIG. 16 is a diagram illustrating an example of a screen display according to an embodiment.

User interface 500 displays the image received. The user selects, in the display screen, the line segment and the plane which are the dimension measurement targets (S18). FIG. 16 is a diagram illustrating an example of a screen display in the above case. In the example illustrated in FIG. 16, line segment D and plane C are selected.

It should be noted that, when only one plane is estimated in the plane estimation (S16), the plane may be automatically selected without performing the plane selection by the user. Alternatively, whether such plane may be selected or not may be confirmed with the user. It should be noted that the plane estimation may be performed automatically by dimension measurer 400 using a shot image or, in the case where a point cloud model is generated, using the point cloud model. In this case, since a plurality of planes are estimated, the user selects, from the plurality of planes, the plane which is the dimension measurement target.

The information of the selected dimension measurement target is sent to dimension measurer 400. Dimension measurer 400 measures, using the line segment model, the dimensions of the dimension measurement targets (S19). Specifically, dimension measurer 400 measures the distance between the line segment and the plane that are selected using the line segment model. Here, the distance between the line segment and the plane is, for example, the minimum distance between the line segment and the plane.

Figure 17:
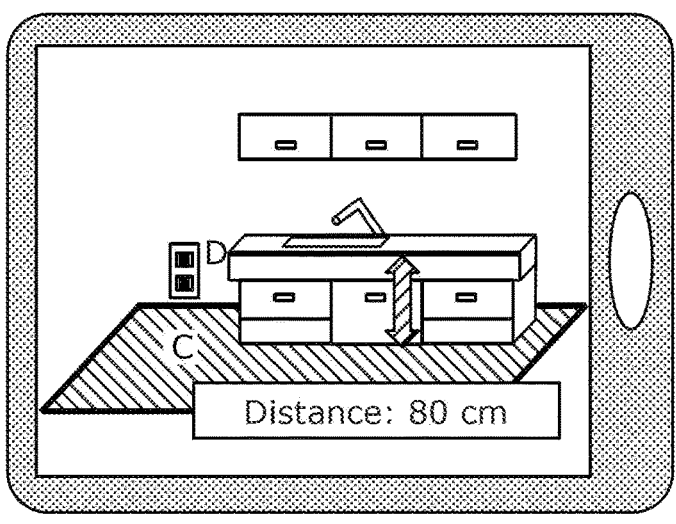
FIG. 17 is a diagram illustrating an example of a screen display according to an embodiment.

The result of the dimension measurement is sent to controller 300. Controller 300 generates dimension information indicating the result of the dimension measurement, and sends the dimension information to user interface 500 (S20). User interface 500 displays the dimension information (S21). FIG. 17 is a diagram illustrating an example of a screen display in the above case. As illustrated in FIG. 17, information indicating the part for which the dimension is measured and the dimension (distance) are displayed.

It should be noted that, in the case where the line segment and the plane are not parallel, the minimum distance between one point (for example, the center point) on the line segment and the plane may be calculated. Alternatively, the minimum distances between respective points on the line segment and the plane may be calculated, and the average value or the median value of the calculated minimum distances may be calculated. Alternatively, a plurality values out of the smallest value, the biggest value, the average value, and the median value of the minimum distances may be calculated, and the calculated values may be presented to the user. Furthermore, the fact that the line segment and the plane are not parallel may be notified to the user.

It should be noted that, in each screen display in which a user operation is required, a message, or the like, that prompts operation by the user or indicates the details of the operation may be displayed. Furthermore, although an example in which text, or the like, is used as a method of presenting information to the user is given in the foregoing description, any method, such as icon displays or voice output, etc., may be used.

Furthermore, although an example in which the line segment which is the dimension measurement target is selected (S18) after the plane estimation (S15 to S17) is performed is described here, the line segment which is the dimension measurement target may be selected first, and the plane estimation (S15 to S17) performed thereafter.

Furthermore, although an example in which the distance between a line segment and a plane is measured is described here, the distance between two line segments may be measured. In this case, the two line segments which are the dimension measurement targets are selected in S18 without performing S15 to S17.

Furthermore, the distance between two planes may be measured. In this case, two planes are estimated by performing S15 to S17 twice. Furthermore, a point and a line segment or a point and a plane may be specified by the user, and the distance between the point and the line segment or the distance between the point and the plane may be measured.

Furthermore, dimension measurement device 100 may have any one or a plurality functions from among a function of measuring the distance between a line segment and a plane, a function of measuring the distance between a line segment and a line segment, or other functions (e.g., function of measuring the distance between a plane and a plane, a point and a line segment, or a point and a plane). In the case of having a plurality of functions, the function to be used may be specified by the user at a predetermined timing (for example, at the start of S11 or S15, etc.), and may be specified by the user at an arbitrary timing. Furthermore, the functions may be switched automatically according to the result of the user's selection of a line segment or a plane. For example, when two line segments are selected as dimension measurement targets by the user, the distance between the two line segments may be measured, and when a line segment and a plane are selected as dimension measurement targets by the user, the distance between the line segment and the plane may be measured.

Figure 18:
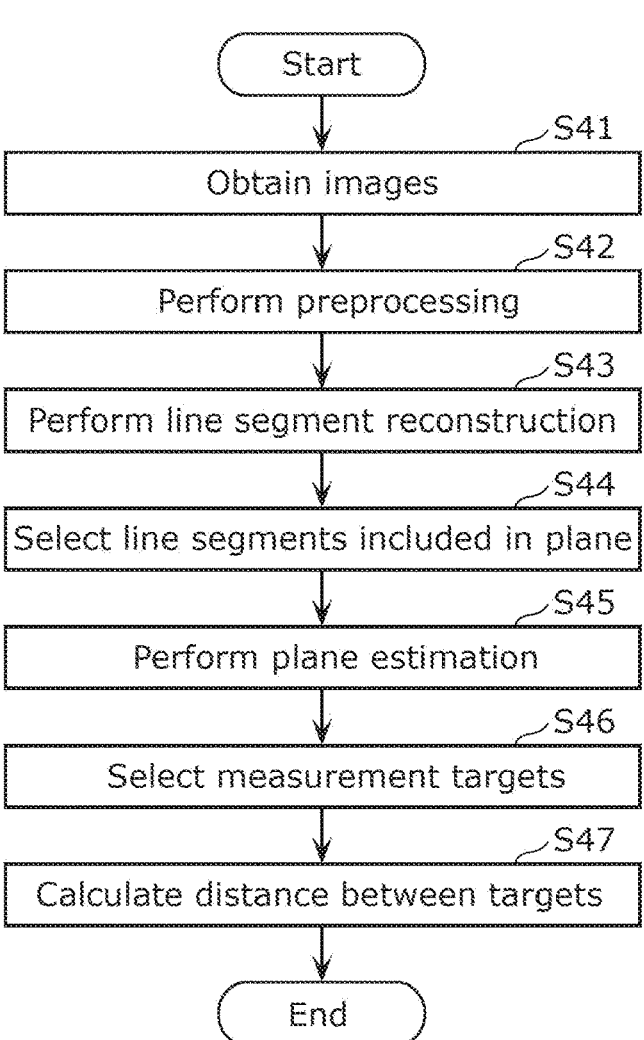
FIG. 18 is a flowchart of a dimension measurement process according to an embodiment.

Next, the flow of processing by dimension measurer 400 will be described. FIG. 18 is a flowchart of the dimension measurement process of dimension measurer 400. First, image obtainer 401 obtains images shot by imaging unit 200 (S41).

Next, preprocessor 402 performs preprocessing on the obtained images (S42). Preprocessing is, for example, brightness adjustment, noise removal, resolution conversion, color space conversion, lens distortion correction, projective transformation, affine transformation, edge enhancement, trimming, or a combination thereof. It should be noted that the preprocessing may be performed in line with the timing at which the dimension measurement is performed, or may be performed in advance. The preprocessed images obtained through the performance of image preprocessing by preprocessor 402 may be stored in storage 304 included in controller 300. It should be noted that the preprocessing by preprocessor 402 need not be executed. For this reason, dimension measurer 400 need not include preprocessor 402.

Next, line segment reconstructor 403 performs line segment reconstruction for calculating the three-dimensional shape of objects in a predetermined space, using images shot by imaging unit 200 (S43). Specifically, for each of the images, line segment reconstructor 403 detects line segments, performs inter-image correspondence, and calculates, by geometrical calculation using the correspondence relationship, a line segment model consisting of the three-dimensional line segments of the predetermined space.

Plane estimator 404 estimates a three-dimensional plane using the line segment model. First, in order to estimate a plane, plane estimator 404 selects line segments included in the plane (S44). For example, these line segments are selected based on a user operation. It should be noted that plane estimator 404 may perform this selection automatically. Next, plane estimator 404 estimates a plane including the selected line segments (S45). It should be noted that the plane estimation process by plane estimator 404 need not be performed. For this reason, dimension measurer 400 need not include plane estimator 404.

Next, measurer 405 selects two line segments, or a line segment and a plane, which are the dimension measurement targets (S46). For example, this selection is performed based on a user operation. It should be noted that measurer 405 may perform this selection automatically. Next, measurer 405 calculates the distance between the two line segments, or between the line segment and the plane, that were selected (S47). Furthermore, the calculated distance is, for example, displayed on user interface 500.

Here, since mapping is performed using line segments in the line segment reconstruction, accuracy deteriorates when the target object is cut off in an image, that is, when the entirety of the target object does not fit within the image. Therefore, in such a case, dimension measurement device 100 may instruct the user to perform image shooting again. For example, dimension measurement device 100 detects an edge inside the image, and determines that the edge (i.e., the target object) is cut off when the detected edge continues up to a border of the image.

Figure 19:
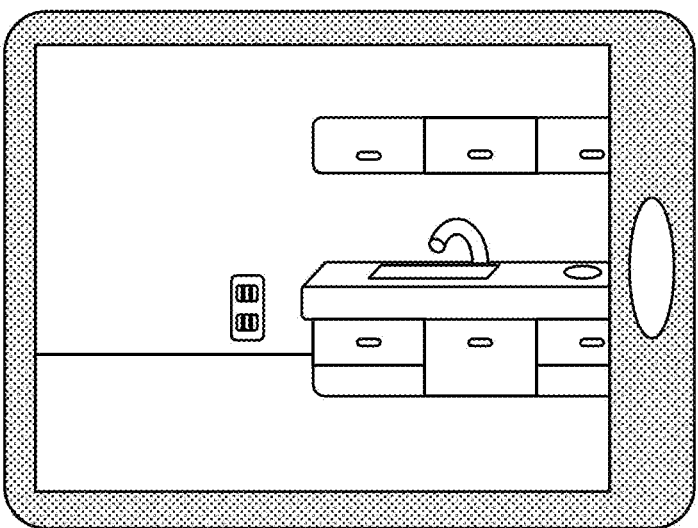
FIG. 19 is a diagram illustrating an example of a screen display according to an embodiment.
Figure 20:
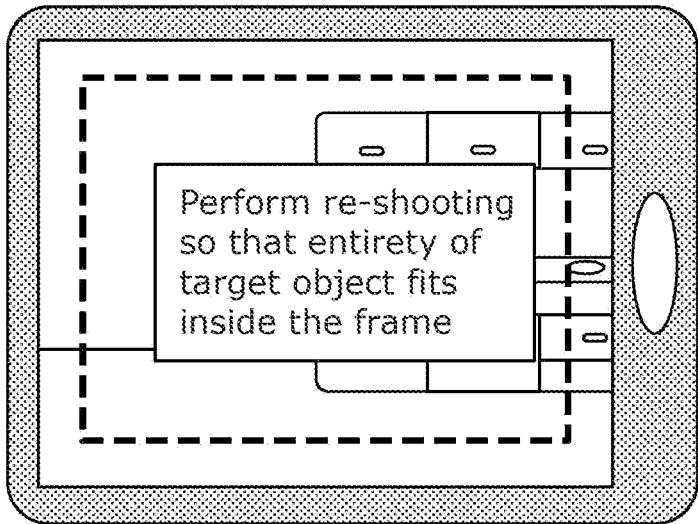
FIG. 20 is a diagram illustrating an example of a screen display according to an embodiment.

FIG. 19 is a diagram illustrating an example of a screen display in which the entirety of a target object (i.e., a kitchen counter) does not fit within the screen display. FIG. 20 is a diagram illustrating an example of a screen display on which a message is displayed in the above case. It should be noted that such a message may be displayed after shooting of a still image, or may be displayed in a state where real-time moving images are displayed on the monitor prior to shooting a still image, or may be displayed during shooting of a moving image. Furthermore, such a warning to the user may be performed by icon display or by voice.

Furthermore, as to the images for line segment reconstruction, when three or more images are to be used, dimension measurement device 100 may select, from a plurality of images, two or more images showing the entirety of the target object, and line segment reconstruction may be performed using the two or more images. In other words, dimension measurement device 100 may perform the line segment reconstruction without using an image in which the target object is cut off.

Figure 21:
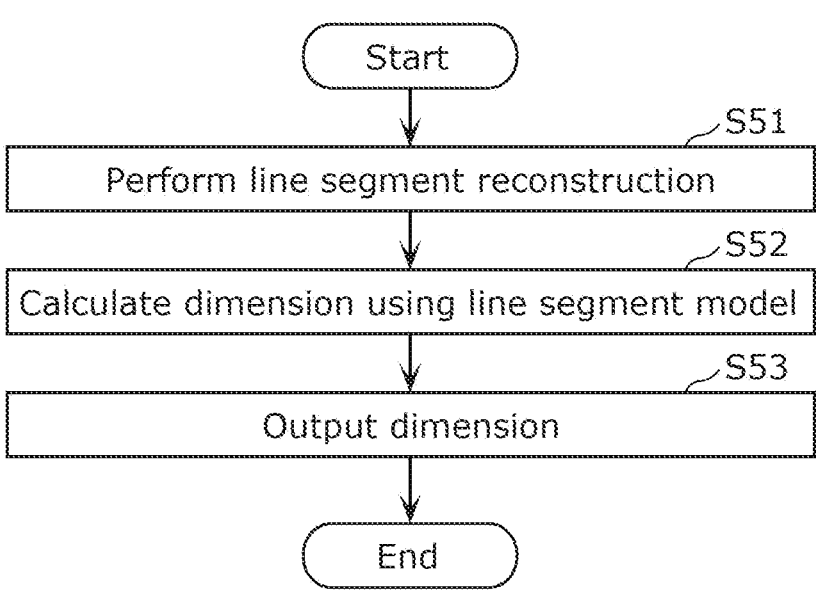
FIG. 21 is a flowchart of a dimension measurement process according to an embodiment.

As described above, the dimension measurement device according to the present embodiment performs the processes illustrated in FIG. 21. The dimension measurement device generates, using a plurality of images generated by shooting a target area from a plurality of viewpoints, a line segment model which is a three-dimensional model of the target area represented by lines (S51). Next, the dimension measurement device calculates a dimension of a particular part inside the target area, using the line segment model (S52). Next, the dimension measurement device outputs the dimension calculated (S53). For example, dimension measurement device 100 presents to the user, or outputs to another device, the calculated dimension.

Accordingly, the dimension measurement device is capable of reducing the processing amount by calculating the dimension using a line segment model. Furthermore, the selection operation by a user can be done easily compared to the case where the user is required to select two points, for example. Specifically, in order to accurately measure height L1 of the kitchen counter illustrated in FIG. 1 by specifying two points, the user needs to specify the nearest two points of the floor and the top surface of the kitchen counter. In contrast, in the case of specifying a line and a line or a line and a plane as in the present embodiment, the shortest distance between the line and the line or the line and the plane is automatically measured, and thus the selection operation by the user is simplified.

For example, the dimension measurement device further displays a user interface including the line segment model. The particular part is determined based on lines which are included in the line segment model and specified by a user via the user interface. Accordingly, by having the user select lines from a line segment model, the dimension of the particular part which is based on the selected lines is measured. Accordingly, the user can easily measure the dimension of the desired part.

For example, the dimension of the particular part is a distance between two lines selected by the user via the user interface. Accordingly, by having the user select two lines from the line segment model, the distance between the selected two lines is measured. Accordingly, the user can easily measure the dimension of the desired part.

For example, the dimension of the particular part is the distance between a line and a plane that are selected by the user via the user interface. Accordingly, by having the user select lines from the line segment model, a dimension between the line and the plane which are based on the selected lines is measured. Accordingly, the user can easily measure the dimension of the desired part.

For example, the plane selected by the user is a plane defined by two lines selected by the user via the user interface. Accordingly, the user can easily select a desired plane.

For example, when an entirety of a target object included in the target area is not included in an image that is shot, the dimension measurement device presents, to the user, a message prompting the user to shoot the entirety of the target object. Accordingly, the dimension measurement device is able to generate a line segment model using an image generated by shooting the entirety of the target object, and thus is able to improve the accuracy of the line segment model. Therefore, the dimension measurement device can improve dimension measurement accuracy.

For example, the line is a line segment. Accordingly, the dimension measurement device is able to generate a line segment model using a line segment which has both ends, without having to use a portion that is cut off in the image, and thus is able to improve the accuracy of the line segment model.

For example, the dimension measurement device includes a processor and memory, and, using the memory, the processor performs the above-described processes.

Although a dimension measurement device, and so on, according to the present embodiment has been described above, the present disclosure is not limited to this embodiment.

Furthermore, each of the processing units included in the dimension measurement device, and so on, according to the foregoing embodiment is implemented typically as an LSI which is an integrated circuit. These processing units may be configured as individual chips or may be configured so that a part or all of the processing units are included in a single chip.

Furthermore, the method of circuit integration is not limited to LSIs, and implementation through a dedicated circuit or a general-purpose processor is also possible. A field programmable gate array (FPGA) that allows for programming after the manufacture of an LSI, or a reconfigurable processor that allows for reconfiguration of the connection and the setting of circuit cells inside an LSI may be employed.

Furthermore, although in each of the foregoing embodiments, the respective structural components are configured using dedicated hardware, the respective structural components may be implemented by executing software programs suitable for the respective structural components. The respective structural components may be implemented by a program executer such as a CPU or a processor reading and executing a software program recorded on a recording medium such as a hard disk or a semiconductor memory.

Furthermore, the present disclosure may be implemented as a dimension measurement method, and the like, performed by a dimension measurement device, and the like.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software.

Furthermore, the sequence in which respective steps in the flowcharts are executed is given as an example to describe the present disclosure in specific terms, and thus other sequences are possible. Furthermore, part of the above-described steps may be executed simultaneously (in parallel) with another step.

Although a dimension measurement device, and so on, according to one or more aspects are described above based on the foregoing embodiment, the present disclosure is not limited to this embodiment. Forms obtained by various modifications to the embodiments that may be conceived by a person of ordinary skill in the art or forms obtained by combining structural components in different embodiments, for as long as they do not depart from the essence of the present invention, may be included in the one or more aspects.

INDUSTRIAL APPLICABILITY

The present disclosure is applicable to a dimension measurement device.

The invention claimed is:

1. A dimension measurement method comprising:

detecting lines included in a plurality of images generated by shooting a target area from a plurality of viewpoints;

generating a line segment model which is a three-dimensional model of the target area that is expressed using the detected lines, the generating of the line segment model including:

calculating respective feature amounts of the detected lines; and performing matching of the detected lines between the plurality of images using the calculated feature amounts to detect corresponding lines between the plurality of images;

calculating a dimension of a particular part inside the target area, using the line segment model; and outputting the dimension calculated.

2. The dimension measurement method according to claim 1, further comprising:

displaying a user interface including the line segment model, wherein the particular part is determined based on lines included in the line segment model, the lines being specified by a user via the user interface.

3. The dimension measurement method according to claim 2, wherein the dimension is a distance between two lines selected by the user via the user interface.

4. The dimension measurement method according to claim 2, wherein the dimension is a distance between a line and a plane that are selected by the user via the user interface.

5. The dimension measurement method according to claim 4, wherein the plane is defined by two lines selected by the user via the user interface.

6. The dimension measurement method according to claim 1, further comprising:

presenting a message to a user when an entirety of a target object included in the target area is not included in an image that has been shot, the message prompting the user to shoot the entirety of the target object.

7. The dimension measurement method according to claim 1, wherein the line segment model is a model generated by removing shapes other than a line from the three-dimensional model.

8. The dimension measurement method according to claim 1, wherein the line segment model is generated by performing line segment reconstruction using the plurality of images.

9. The dimension measurement method according to claim 1, wherein the generating of the line segment model includes:

estimating respective three-dimensional positions of the detected lines using the respective feature amounts.

10. The dimension measurement method according to claim 1, wherein each of the detected lines is a line segment.

11. A dimension measurement device comprising:

a processor; and memory, wherein using the memory, the processor:

detects lines included in a plurality of images generated by shooting a target area;

generates a line segment model which is a three-dimensional model of the target area that is expressed using the detected lines, wherein in the generation of the line segment model, the processor:

calculates respective feature amounts of the detected lines; and performs matching of the detected lines between the plurality of images using the calculated feature amounts to detect corresponding lines between the plurality of images;

calculates a dimension of a particular part inside the target area, using the line segment model; and outputs the dimension calculated.

* * * * *